United States Patent
Miyahara et al.

(10) Patent No.: US 7,720,452 B2
(45) Date of Patent: May 18, 2010

(54) RECEPTION CIRCUIT, RADIO-CONTROLLED TIMEPIECE, AND RECEPTION CIRCUIT CONTROL METHOD

(75) Inventors: Fumiaki Miyahara, Nagano-ken (JP); Teruhiko Fujisawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 516 days.

(21) Appl. No.: 11/763,332

(22) Filed: Jun. 14, 2007

(65) Prior Publication Data

US 2008/0014887 A1    Jan. 17, 2008

(30) Foreign Application Priority Data

Jul. 12, 2006  (JP)  ............... 2006-191870

(51) Int. Cl.
  *H04B 1/18*  (2006.01)
  *G04C 11/02*  (2006.01)
(52) U.S. Cl. .............. 455/191.1; 455/197.2; 455/181.1; 368/47; 368/55
(58) Field of Classification Search ............ 455/193.1, 455/151.1, 151.2, 418, 419, 191.1, 191.2, 455/255, 265, 197.2, 181.1; 367/47, 52, 367/53, 55
See application file for complete search history.

(56) References Cited

U.S. PATENT DOCUMENTS

| | | | |
|---|---|---|---|
| 6,850,468 B2 * | 2/2005 | Fujisawa et al. | 368/47 |
| 6,934,521 B1 * | 8/2005 | Fleury et al. | 455/171.1 |
| 7,075,859 B2 * | 7/2006 | Miyahara et al. | 368/47 |
| 7,095,679 B2 * | 8/2006 | Fujisawa et al. | 368/47 |
| 7,307,919 B2 * | 12/2007 | Fujisawa et al. | 368/47 |
| 7,515,887 B2 * | 4/2009 | Saitoh | 455/191.1 |
| 7,583,942 B2 * | 9/2009 | Ihara | 455/193.1 |
| 2004/0229582 A1 | 11/2004 | Miyasita et al. | |

FOREIGN PATENT DOCUMENTS

| | | |
|---|---|---|
| EP | 1500991 A1 | 1/2005 |
| JP | 2002267775 | 9/2002 |
| JP | 2003060520 | 2/2003 |
| JP | 2005079919 | 3/2005 |
| JP | 2006060849 | 3/2006 |
| JP | 2006067607 | 3/2006 |
| JP | 2006191679 | 7/2006 |

* cited by examiner

*Primary Examiner*—Sonny Trinh

(57) ABSTRACT

A reception circuit can receive a plurality of standard time signals and has a reception means for selectively receiving and demodulating any one of the plural standard time signals, and a control means for outputting a control signal that controls the reception means. The reception means includes a signal amplifier unit for amplifying a reception signal representing the received standard time signal; a signal extraction unit for extracting a signal of a specific frequency from the amplified reception signal; a rectifier unit for rectifying the extracted signal of the specific frequency; and a demodulation unit for demodulating the rectified signal of the specific frequency. The signal extraction unit includes a plurality of crystal filters corresponding to the frequencies of the plural standard time signals; a plurality of parallel capacitances corresponding to the plural crystal filters and parallel connected to the plural crystal filters; a filter switching unit for switching the plural crystal filters based on the control signal; and a parallel capacitance switching unit for switching the plural parallel capacitances based on the control signal. The control means outputs to the filter switching unit and the parallel capacitance switching unit a control signal denoting the switch states enabling the reception means to receive the standard time signal.

8 Claims, 10 Drawing Sheets

| STANDARD TIME SIGNAL TO BE RECEIVED | PARAMETER NAME | TUNING CAPACITOR | CRYSTAL FILTER | PARALLEL CAPACITANCE | REFERENCE VOLTAGE |
|---|---|---|---|---|---|
| JJY40 | data_1 | C1 | XT1 | CC1 | VREF2 |
| JJY60 | data_2 | C2 | XT2 | CC2 | VREF2 |
| MSF | data_3 | C2 | XT2 | CC2 | VREF4 |
| DCF77 | data_4 | C3 | XT3 | CC3 | VREF3 |
| WWVB | data_5 | C2 | XT2 | CC2 | VREF1 |

FIG. 6

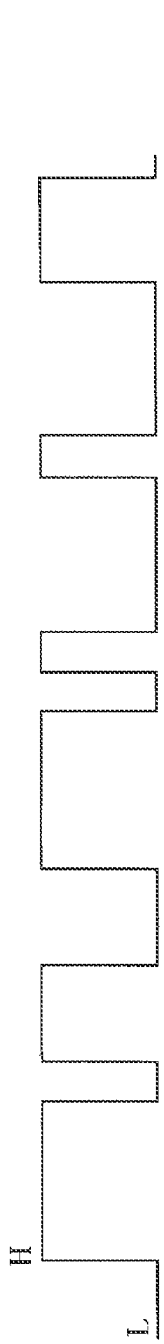
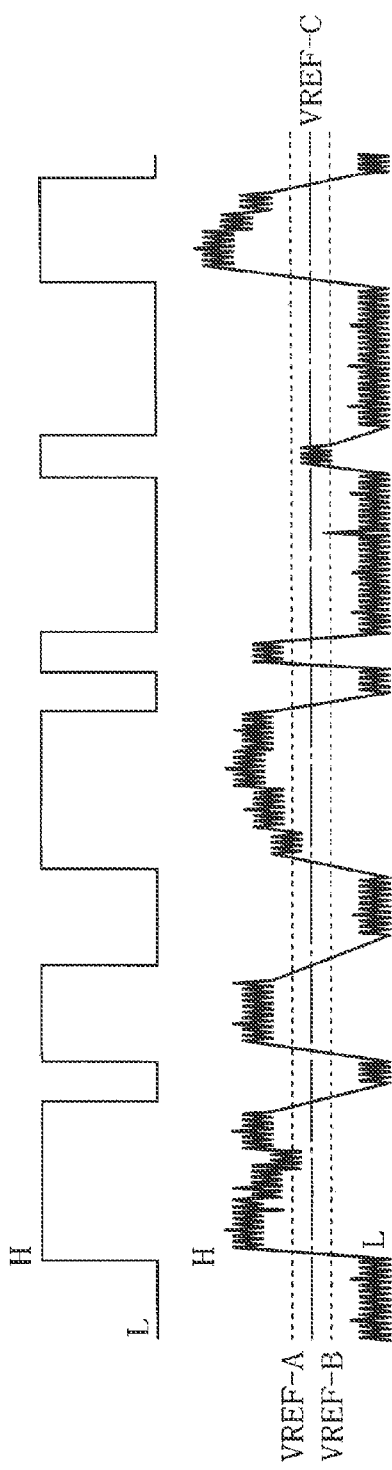
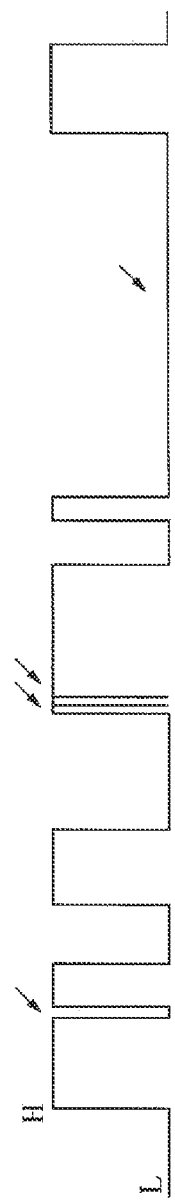
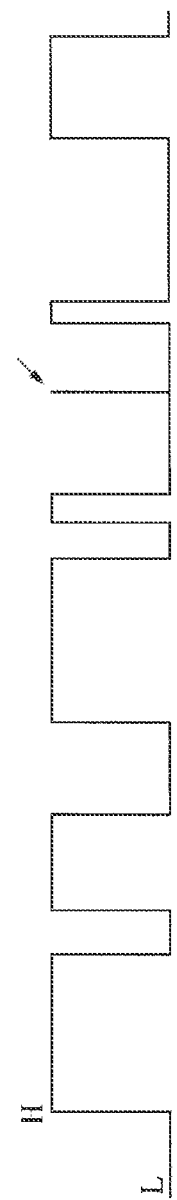
FIG. 7A
FIG. 7B
FIG. 7C
FIG. 7D
FIG. 7E

RECEPTION CIRCUIT, RADIO-CONTROLLED TIMEPIECE, AND RECEPTION CIRCUIT CONTROL METHOD

CROSS-REFERENCE TO RELATED APPLICATIONS

Japanese Patent application No. 2006-191870 is hereby incorporated by reference in its entirety.

BACKGROUND OF THE INVENTION

1. Field of the Invention

The present invention relates to a reception circuit, a radio-controlled timepiece having the reception circuit, and a control method for the reception circuit.

2. Description of the Related Art

Radio-controlled timepieces that automatically correct the internally kept time to display the current time based on timecode information contained in a long-wave standard time signal are known from the literature. This type of radio-controlled timepiece has an internal reception circuit for receiving the long-wave standard time signal and outputting the time code. Japanese Unexamined Patent Appl. Pub. JP-A-2003-60520 (FIG. 2), for example, teaches a reception circuit that amplifies, detects, and demodulates a reception signal for the long-wave standard time signal received by the antenna.

The reception circuit (receiver) taught in JP-A-2003-60520 passes the long-wave standard time signal received by the antenna through an AGC amplifier and a crystal filter for filtering and tuning, then through a wave detection/rectification circuit and a wave-shaping circuit to input the timecode contained in the long-wave standard time signal to a control means. By switching a tuning switch so that a first coil bobbin is active, the inductance is adjusted to the 40-kHz reception frequency and long-wave standard time signals that are transmitted at 40 kHz can be received. If the tuning switch is set so that a second coil bobbin is active, the inductance is adjusted to the 60-kHz reception frequency and long-wave standard time signals that are transmitted at 60 kHz can be received. The receiver can thus receive long-wave standard time signals at different transmission frequencies.

The crystal filter in the reception circuit taught in JP-A-2003-60520 has two crystal oscillators, one operating at the 40-kHz oscillation frequency and the other at the 60-kHz oscillation frequency. By using the crystal oscillator tuned to the 40-kHz oscillation frequency to receive long-wave standard time signals transmitted at 40 kHz, and using the oscillator tuned to the 60-kHz oscillation frequency to receive long-wave standard time signals transmitted at 60 kHz, signals containing the desired frequency component can be extracted from the received standard time signal.

Japanese Unexamined Patent Appl. Pub. JP-A-2006-60849 teaches a reception circuit that uses a comparator as the wave detector for detecting the signal filtered by the crystal filter. This comparator compares the reception signal extracted from the received long-wave standard time signal with a specified reference voltage and outputs a binary signal.

The comparator used in the reception circuit (RF reception unit) taught in JP-A-2006-60849 outputs a HIGH level signal if the reception signal voltage is greater than the reference voltage, and outputs a LOW level signal if the reception signal voltage is lower than the reference voltage. The signal derived from the received long-wave standard time signal can thus be demodulated.

A problem with the reception circuit taught in JP-A-2003-60520 is that the filtered reception signal output from the crystal filter contains noise resulting from high frequency signal components, for example.

More specifically, a signal of the oscillation frequency of the crystal filter can be extracted from the reception signal by passing the reception signal through the crystal filter in the reception circuit taught in JP-A-2003-60520, but the extracted signal may also contain signal components at frequencies other than the oscillation frequency of the crystal filter. To handle such cases, a capacitor or other parallel capacitance could be disposed parallel to the crystal filter to cancel high frequency noise. However, if a crystal filter operating at the frequency of the received long-wave standard time signal and a parallel capacitance adjusted to the crystal filter are not provided in parallel, high frequency noise cannot be sufficiently cancelled and the extracted signal will contain noise.

A problem with the reception circuit taught in JP-A-2006-60849 is that the received long-wave standard time signal cannot be correctly demodulated if any deviation in the reference voltage input to the comparator is introduced when manufacturing the reception circuit.

More specifically, if noise caused by some other high frequency component is contained in the reception signal input to the comparator, the voltage may shift at the peak (high voltage level) and the bottom (low voltage level) of the reception signal. If the reference voltage is set to the median voltage between the peak voltage and the bottom voltage, noise will cause the reception signal to go above or below the reference voltage less frequently and the error rate of the binary signal will therefore drop. However, if the reference voltage is offset from the median between the top and bottom voltages of the reception signal, the effects of noise may cause a binary signal that is different from the signal that is actually carried by the standard time signal to be output. When this happens the standard time signal cannot be correctly demodulated.

This problem is exacerbated when the reception circuit can receive different long-wave standard time signals.

For example, if the peak voltage is 100%, the bottom voltage is set to 10% to receive the TCO signal of the Japanese standard time signal, but the bottom voltage is set to 25% to receive the TCO signal of the German standard time signal. As a result, if the reference voltage of the reception circuit is set according to the standard time signal used in Japan and the reception circuit is used to receive the German standard time signal, the voltage at the signal bottom cannot be correctly detected and the standard time signal cannot be correctly demodulated.

SUMMARY OF THE INVENTION

The reception circuit, the radio-controlled timepiece, and the reception circuit control method of the invention can correctly demodulate the received standard time signal.

A reception circuit according to a preferred aspect of the invention can receive a plurality of standard time signals and has a reception means for selectively receiving and demodulating any one of the plural standard time signals, and a control means for outputting a control signal that controls the reception means. The reception means includes a signal amplifier unit for amplifying a reception signal representing the received standard time signal; a signal extraction unit for extracting a signal of a specific frequency from the amplified reception signal; a rectifier unit for rectifying the extracted signal of the specific frequency; and a demodulation unit for demodulating the rectified signal of the specific frequency. The signal extraction unit includes a plurality of crystal filters corresponding to the frequencies of the plural standard time signals; a plurality of parallel capacitances corresponding to the plural crystal filters and parallel connected to the plural crystal filters; a filter switching unit for switching the plural crystal filters based on the control signal; and a parallel capacitance switching unit for switching the plural parallel capacitances based on the control signal. The control means outputs to the filter switching unit and the parallel capacitance switching unit a control signal denoting the switch states enabling the reception means to receive the standard time signal.

In this aspect of the invention the filter switching unit and the parallel capacitance switching unit select the crystal filter and the parallel capacitance appropriate to the standard time signal to be received by the reception means from among the plurality of crystal filters and the plurality of parallel capacitances based on a control signal input from the control means, and the reception signal of the received standard time signal is passed through the selected crystal filter and parallel capacitance.

High frequency noise can be removed from the reception signal by passing through the parallel capacitance a signal of inverse phase to the signal passed through the crystal filter and then combining the signal passed through the parallel capacitance and the signal extracted by the crystal filter. Because the crystal filter and the parallel capacitance that pass the reception signal are selected according to the standard time signal represented by the reception signal, the effect of cancelling high frequency noise in the reception signal can be improved. The standard time signal can therefore be correctly demodulated because high frequency noise can be efficiently removed from the reception signal input through the signal extraction unit to the demodulation unit.

Switching the crystal filter by means of the filter switching unit and switching the parallel capacitance by means of the parallel capacitance switching unit are controlled by the control signal input from the control means. The crystal filter and the parallel capacitance can therefore be reliably selected to receive the standard time signal as a result of the control means outputting appropriate control signals to the filter switching unit and the parallel capacitance switching unit. When receiving a standard time signal, high frequency noise can therefore be reliably removed from the reception signal representing the received standard time signal.

The reception circuit preferably also has an antenna for receiving the plurality of standard time signals. In this aspect of the invention the reception means includes a tuning unit for switching the tuning frequency of the antenna based on the control signal to receive any one of the plural standard time signals, and the control means outputs to the tuning unit a control signal denoting the switch state enabling the reception means to receive the standard time signal.

In this aspect of the invention the tuning unit switches the frequency received by the antenna based on the control signal from the control means. This reception frequency switching operation of the tuning unit is linked to the crystal filter and parallel capacitance switching operations of the filter switching unit and the parallel capacitance switching unit described above. As a result, high frequency noise can be reliably removed form the reception signal of the standard time signal and reception performance can be improved when the reception means receives the standard time signal.

In another aspect of the invention the demodulation unit includes a comparison unit for outputting a binary signal that is digitized based on a reference voltage and the signal of the specific frequency rectified by the rectifier unit; the reception means includes a reference voltage switching unit that can output a plurality of reference voltages to the comparison unit and selects the output reference voltage according to the standard time signal to be received by the reception circuit; and the control means outputs to the reference voltage switching unit a control signal denoting the switch states enabling the reception means to receive the standard time signal to be received.

In this aspect of the invention the control means outputs a control signal to the reference voltage switching unit so that the reference voltage appropriate to the standard time signal to be received by the reception means is output. Based on this control signal, the reference voltage switching unit can therefore select and output the reference voltage that is appropriate to the standard time signal to be received from among the plural reference voltages that can be output. Because the reference voltage appropriate to the standard time signal to be received can thus be output, the reception signal of the standard time signal can be correctly digitized using the reference voltage, and the standard time signal can be correctly demodulated.

The reference voltage is selected according to the control signal from the control means. The reference voltage is therefore selected in conjunction with switching the crystal filter and the parallel capacitance and switching the frequency of the tuning unit. Because these switching operations can be controlled according to the standard time signal to be received, the standard time signal reception performance of the reception circuit can be improved in addition to correctly demodulating the received standard time signal.

By measuring the voltage level of each reference voltage that can be output by the reference voltage switching unit during the manufacturing process and setting the reference voltage for each standard time signal to be received based on the measured voltage levels so that the control means outputs control signals causing the reference voltage switching unit to output the set reference voltage, the reference voltage switching unit can output the reference voltage appropriate to the standard time signal to be received. The standard time signal can thus be more reliably demodulated.

Another aspect of the invention is a reception circuit that can receive a plurality of standard time signals, the reception circuit including a reception means for selectively receiving and demodulating any one of the plural standard time signals, and a control means for outputting a control signal that controls the reception means. The reception means includes a signal amplifier unit for amplifying a reception signal representing the received standard time signal; a rectifier unit for rectifying the amplified reception signal; a filter unit for filtering the rectified reception signal; a comparison unit for outputting a binary signal that is digitized based on a reference voltage and the filtered reception signal; and a reference voltage switching unit that can output different reference voltages to the comparison unit and selects the output reference voltage according to the control signal. The control means outputs to the reference voltage switching unit a control signal denoting the switch states enabling the reception means to receive the standard time signal to be received.

As with the reception circuit according to the first aspect of the invention described above, the reference voltage switching unit in this aspect of the invention outputs to the comparison unit a reference voltage appropriate to the standard time signal to be received based on the control signal input from the control means. This enables the comparison unit to correctly demodulate the standard time signal by comparing the reference voltage with the reception signal of the standard time signal that was received.

Furthermore, by measuring the voltage level of each reference voltage that can be output by the reference voltage switching unit and configuring the control means to output a control signal based on these measured voltage levels so that the reference voltage switching unit outputs the reference voltage corresponding to the standard time signal to be received, the reference voltage switching unit can reliably output the reference voltage appropriate to the standard time signal to be received. The demodulation precision of the standard time signal can therefore be improved.

The reception circuit according to another aspect of the invention additionally has a serial communication bus connecting the control means and the reception means, and the control means serially outputs the control signal. The reception means includes a decoding unit that decodes the control signal input by serial communication over the serial communication bus and controls switch operation based on the decoded control signal.

In this aspect of the invention the decoding unit decodes the input control signal and controls the switching operations based on the decoded control signal, and the control signal output from the control means can therefore be a simple signal. Errors in the control signal input to the decoding unit can therefore be reduced, and the reliability of communication between the control means and the reception means can be improved.

Furthermore, because the control means and the reception means are connected by a serial bus, the number of data lines required in the communication bus connecting the control means and the reception means can be reduced, and the arrangement of the reception circuit can be simplified. Furthermore, the data transfer rate can be improved and the signal error rate can be further reduced by the control means serially outputting the control signals. As a result, reference voltage output response and reliability can be further improved.

Yet further preferably, the reception circuit also has a storage means for storing switching information denoting the switch states for each of the plural standard time signals, and the control means outputs the control signal based on the switching information.

In this aspect of the invention the control means outputs the control signal based on switching information that is stored in the storage means and denotes the crystal filter and parallel capacitance that are used to receive each of the plural standard time signals. This eliminates the need for the control means to determine the crystal filter and parallel capacitance that are required for the reception means to receive the standard time signal. The control signal causing the filter switching unit and the parallel capacitance switching unit to select the required crystal filter and parallel capacitance can therefore be output quickly, and crystal filter and parallel capacitance switching control errors by the control means can be eliminated. Response can therefore be improved when starting to receive a standard time signal.

Furthermore, if the frequency selections of the tuning unit are also stored as switching information, the control means can appropriately change the tuning frequency of the tuning unit by outputting a control signal based on this switching information. In addition, if the reference voltage selections of the reference voltage switching unit are also stored as switching information, the reference voltage switching unit can also be caused to output the reference voltage appropriate to the standard time signal to be received. The reception response of the reception circuit can therefore be further improved.

A radio-controlled timepiece according to another aspect of the invention has the reception circuit described above and a time adjustment circuit for correcting internal time information based on a signal demodulated by the reception circuit.

This aspect of the invention affords the same benefits as the reception circuit described above.

More specifically, the filter switching unit and the parallel capacitance switching unit switch the crystal filter and parallel capacitance of the signal extraction unit of the reception means based on a control signal input from the control means according to the standard time signal to be received by the reception means. As a result, high frequency noise can be desirably removed from the reception signal for the standard time signal. The standard time signal can therefore be correctly demodulated. In addition, the internal time can also be corrected because the time adjustment circuit corrects the internal time information based on the demodulated signal.

Furthermore, because the reference voltage switching unit of the reception circuit outputs the reference voltage suitable to the standard time signal to be received by the reception means to the comparator based on the control signal input from the control means, the reception signal of the standard time signal being received can be correctly converted to a binary signal using the reference voltage. As described above, the standard time signal can therefore be correctly demodulated and the internal time information can be adjusted correctly.

Another aspect of the invention is a control method for a reception circuit that can receive a plurality of standard time signals and has a reception means for selectively receiving and demodulating any one of the plural standard time signals. The reception means includes a plurality of crystal filters each of which extracts a signal of a different specific frequency from a reception signal representing the received standard time signal, a plurality of parallel capacitances provided according to the plural standard time signals and parallel connected to the plural crystal filters, a filter switching unit for switching the plural crystal filters based on the control signal, and a parallel capacitance switching unit for switching the plural parallel capacitances based on the control signal. The control method has a filter switching step for switching the filter switching unit to select the crystal filter appropriate to the standard time signal to be received by the reception means from among the plural crystal filters; and a parallel capacitance switching step for switching the parallel capacitance switching unit to select the parallel capacitance appropriate to the standard time signal to be received by the reception means from among the plural parallel capacitances.

This aspect of the invention affords the same benefits as the reception circuit described above.

More specifically, based on the control signal from the control means in the filter switching step and the parallel capacitance switching step, the filter switching unit and the parallel capacitance switching unit switch the crystal filter and the parallel capacitance through which the reception signal of the standard time signal passes to the crystal filter and the parallel capacitance appropriate to the standard time signal to be received by the reception means. As a result, high frequency noise can be removed when extracting the signal in the frequency band of the standard time signal from the reception signal. The high frequency noise cancellation effect can also be improved in this case because the parallel capacitance is set according to the standard time signal to be received. The standard time signal can therefore be correctly demodulated because unnecessary high frequency noise can be desirably removed.

As described above, the invention can effectively remove high frequency noise from the reception signal of the standard time signal because the crystal filter and parallel capacitance matching the standard time signal to be received are selected from among a plurality of crystal filters and a plurality of parallel capacitances.

Furthermore, because the reference voltage switching unit can output a plurality of different reference voltages and outputs the reference voltage matching the standard time signal to be received to the comparator, a desirable binary signal that differs little if at all from the standard time signal can be output based on the selected reference voltage and the received signal representing the standard time signal. The standard time signal can therefore be correctly demodulated.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 shows an example of the content stored in the storage unit in this preferred embodiment of the invention.

FIG. 7A shows the original waveform of the binary signal, FIG. 7B shows the waveform after detecting the envelope of the binary signal, FIG. 7C shows the waveform of the binary signal based on the reference voltage and the signal of the waveform after envelope detection, FIG. 7D shows the waveform of the binary signal based on the reference voltage and the signal of the waveform after envelope detection, and FIG. 7E shows the waveform of the binary signal based on the reference voltage and the signal of the waveform after envelope detection.

DESCRIPTION OF THE PREFERRED EMBODIMENTS

Preferred embodiments of the present invention are described below with reference to the accompanying figures.

(1) Timepiece Arrangement

Figure 1:
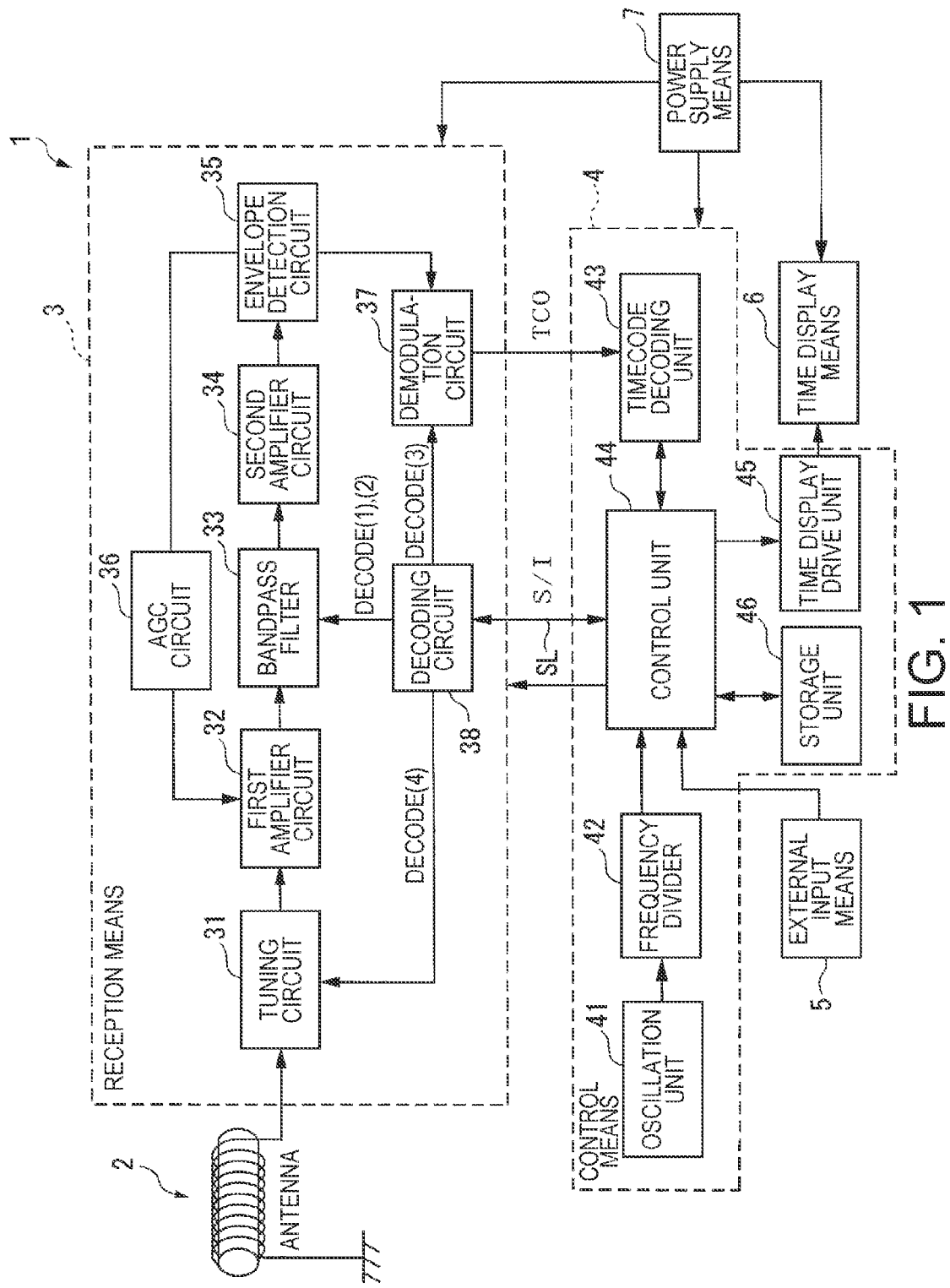
FIG. 1 is a block diagram showing the arrangement of a timepiece according to a preferred embodiment of the invention.

FIG. 1 is a block diagram showing the arrangement of a timepiece 1 according to a preferred embodiment of the invention.

The timepiece 1 according to this embodiment of the invention is a radio-controlled timepiece that receives a long-wave standard time signal (also referred to below as simply a standard time signal), demodulates the TCO (timecode output) signal of the standard time signal, and adjusts the internally kept time based on this TCO signal. As shown in FIG. 1 this timepiece 1 has an antenna 2, a reception means 3, a control means 4, an external input means 5, a time display means 6, and a power supply means 7.

The external input means 5 is used by the user to operate the timepiece 1, and could be the crown or a button, for example.

The time display means 6 displays the time, and could be an analog display using hands or a digital display such as a liquid crystal panel or organic EL (electroluminescent) panel for digitally displaying the time, for example.

The power supply means 7 supplies power to the reception means 3, the control means 4, and the time display means 6, and could be a battery, for example.

(2) Arrangement of the Reception Means 3

The reception means 3 is connected to the antenna 2 and the control means 4, and based on a control signal input from the control means 4 amplifies, rectifies, and filters the standard time signal selectively received by the antenna 2, demodulates the TCO signal, and outputs the TCO signal to the control means 4.

The reception means 3 includes a tuning circuit 31, a first amplifier circuit 32, a bandpass filter 33, a second amplifier circuit 34, an envelope detection circuit 35, an AGC (automatic gain control) circuit 36, a demodulation circuit 37, and a decoding circuit 38.

Figure 2:
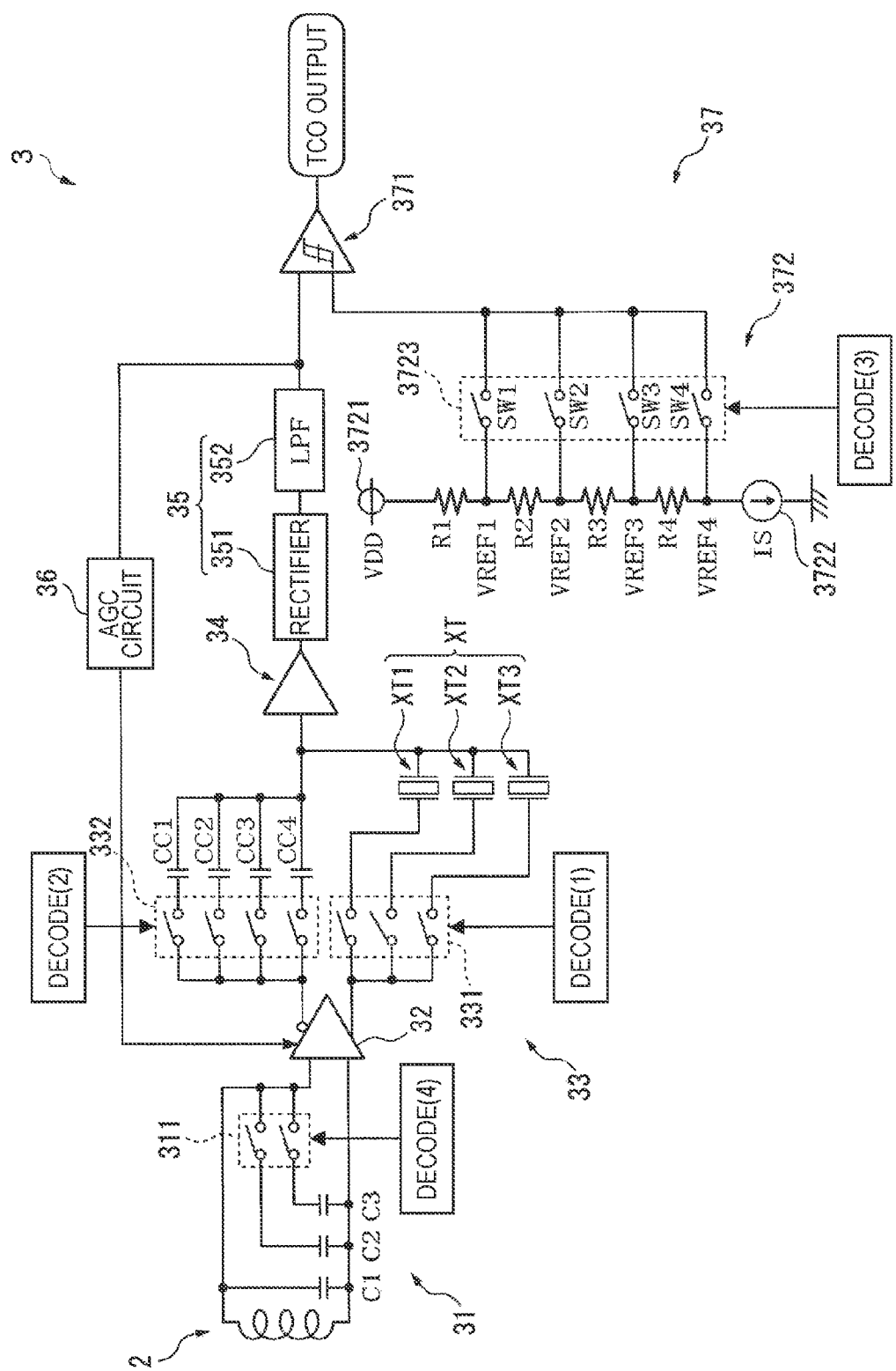
FIG. 2 is a circuit diagram showing the arrangement of the reception means in this preferred embodiment of the invention.

FIG. 2 is a circuit diagram of the reception means 3.

The tuning circuit 31 corresponds to the tuning unit of the accompanying claims, together with the antenna 2 renders a parallel resonance circuit, and causes the antenna 2 to receive signals of a particular frequency. As shown in FIG. 2, the tuning circuit 31 has three capacitors C1 to C3 each having a different capacitance, and a frequency switching unit 311 having two switches.

The frequency switching unit 311 changes the total capacitance of the three capacitors C1 to C3 by switching the on/off states of the two switches based on a signal input from the decoding circuit 38 described below. This changes the frequency of the standard time signal that is received by the antenna 2. The received standard time signal is then converted to a voltage signal and is output to the first amplifier circuit 32.

The tuning circuit 31 in this aspect of the invention can receive the JJY, MSF, DCF, and WWVB standard time signals that are transmitted in Japan, the UK, Germany, and the United States, and the selectable frequencies are therefore 44 kHz, 60 kHz, and 77.5 kHz.

The tuning circuit 31 in this aspect of the invention has three capacitors C1 to C3 and a frequency switching unit 311 with two switches, but the numbers of capacitors and switches could be greater. More specifically, any arrangement that can switch the tuning frequency of the antenna 2 to the frequency of the standard time signal to be received by using a plurality of switches to select a plurality of capacitors could be used.

The first amplifier circuit 32 corresponds to the signal amplifier unit of the accompanying claims, and adjusts the gain according to a signal input from the AGC circuit 36 described below to boost the reception signal input from the tuning circuit 31 to a constant amplitude and output the amplified signal to the bandpass filter 33. More specifically, the first amplifier circuit 32 reduces the gain according to the signal input from the AGC circuit 36 if the reception signal amplitude is high, and increases the gain if the amplitude is low, so that the reception signal is amplified to a prescribed amplitude.

The bandpass filter 33 corresponds to the signal extraction unit and filter of the accompanying claims, and is a filter for extracting signals in a desired frequency band. More specifically, the bandpass filter 33 removes high frequency components other than the carrier wave component from the reception signal input from the first amplifier circuit 32, and extracts a signal in the frequency band of the received standard time signal. This bandpass filter 33 has three crystal filters XT (ST1 to ST3) connected in parallel, a filter switching unit 331 having three switches each connected to one of the crystal filters XT, four parallel capacitances CC1 to CC4 parallel connected to the crystal filters XT and the filter switching unit 331, and a parallel capacitance switching unit 332 having four switches each connected to one of the parallel capacitances CC1 to CC4.

Figure 3:
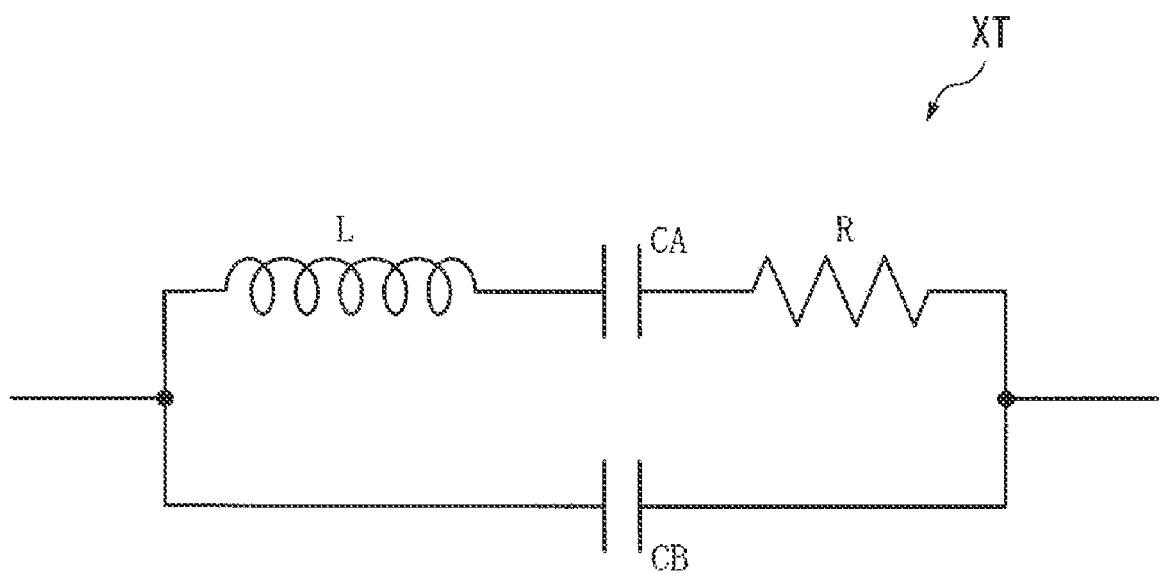
FIG. 3 is a circuit diagram of the crystal filter in this preferred embodiment of the invention.

FIG. 3 is a circuit diagram of the crystal filters XT.

The three crystal filters XT1 to XT3 respectively filter signals at frequencies of 40 kHz, 60 kHz, and 77.5 kHz. More specifically, the oscillation frequencies of the crystal filters XT1 to XT3 are set to 40 kHz, 60 kHz, and 77.5 kHz. As shown in FIG. 3, these crystal filters XT are equivalence circuits having a series circuit including a coil L, a capacitance CA, and a resistance R, and an equivalent parallel capacitance CB.

Referring again to FIG. 2, the filter switching unit 331 sets the internal switches of the filter switching unit 331 based on the signal input from the decoding circuit 38 described below to set the frequency of the signal that is extracted from the reception signal by switching the crystal filter XT through which the signal output from the non-inverted output node of the first amplifier circuit 32 passes.

The parallel capacitances CC1 to CC4 are capacitors that are disposed between the inverted output node of the first amplifier circuit 32 and the input node of the second amplifier circuit 34 as shown in FIG. 2. Each of the parallel capacitances CC1 to CC4 has a different capacitance, and the parallel capacitance switching unit 332 controls which of the parallel capacitances CC1 to CC4 are active.

The parallel capacitance switching unit 332 controls the on/off state of each of the switches based on signal input from the decoding circuit 38 described below, and thereby switches the parallel capacitance CC1 to CC4 to which the signal output from the inverted output node of the first amplifier circuit 32 is connected.

The bandpass filter 33 is described next.

The equivalent parallel capacitance CB of each crystal filter XT is specific to each crystal filter XT, and is the cause of high frequency component noise passing the first amplifier circuit 32. This high frequency component induces standard time signal demodulation error and therefore must be removed. Parallel capacitances CC1 to CC4 for cancelling this high frequency noise are therefore parallel connected to the crystal filter XT. However, if the parallel capacitance to which the reception signal passed by the first amplifier circuit 32 is connected is not the parallel capacitance for the crystal filter of the same frequency as the standard time signal to be received, the high frequency noise cancelling effect of the parallel capacitance will not be sufficient and high frequency noise will be left in the reception signal passed by the bandpass filter 33.

The parallel capacitance switching unit 332 of the bandpass filter 33 in the reception means 3 in this aspect of the invention therefore switches the parallel capacitance inserted between the inverted output node of the first amplifier circuit 32 and the input node of the second amplifier circuit 34 based on a signal input from the decoding circuit 38, thereby improving the high frequency noise cancellation and enabling efficiently removing the high frequency noise. The parallel capacitance CC1 to CC4 switching operation of the parallel capacitance switching unit 332 is described in further detail below.

The second amplifier circuit 34 further amplifies the reception signal input form the bandpass filter 33 by a fixed gain. The second amplifier circuit 34 is not shown in detail in the figures, but has an amplifier and an input resistance, and can adjust the input resistance. More specifically, the input resistance inserted between the power source and the amplifier is rendered by a plurality of resistors each having a different resistance and a switch disposed to each resistor, and each of the switches can be externally controlled.

The envelope detection circuit 35 has a rectifier 351 as a rectification unit and a low-pass filter 352 as a filter unit, and outputs an envelope signal acquired by rectifying and filtering the reception signal input from the second amplifier circuit 34 to the AGC circuit 36 and the demodulation circuit 37.

Based on the envelope signal input from the envelope detection circuit 35, the AGC circuit 36 outputs a signal setting the gain used by the first amplifier circuit 32 to amplify the reception signal.

The demodulation circuit 37 corresponds to the demodulation unit of the accompanying claims, and as shown in FIG. 2 has a digital comparator 371 and a reference voltage switching unit 372. The reference voltage switching unit 372 switches and outputs a specific reference voltage (VREF) to the comparator 371.

The comparator 371 corresponds to the comparison unit of the accompanying claims and has two input nodes. One of the input nodes is connected to the envelope detection circuit 35, and the other input node is connected to the reference voltage switching unit 372. The comparator 371 outputs a binary signal, that is, the TCO signal, based on the envelope signal input form the envelope detection circuit 35 and the reference voltage input from the reference voltage switching unit 372.

More specifically, if the voltage of the envelope signal is greater than the reference voltage, the comparator 371 outputs a signal at a HIGH voltage level as the TCO signal to the control means 4, and if the envelope signal voltage is lower than the reference voltage, outputs a LOW level signal with a voltage lower than the voltage of the HIGH level signal as the TCO signal. Alternatively, the comparator 371 could output a LOW level signal as the TCO signal to the control means 4 when the envelope signal voltage is greater than the reference voltage, and output a HIGH level signal when the envelope signal voltage is less than the reference voltage.

The reference voltage switching unit 372 generates the reference voltage VREF (VREF1 to VREF4) from the supply voltage VDD input from the constant voltage supply 3721, and outputs the reference voltage VREF to the comparator 371.

The reference voltage switching unit 372 includes the constant voltage supply 3721, four resistors R1 to R4, a conductance switching unit 3723, and a constant current source 3722. The resistors R1 to R4 are disposed between the constant voltage supply 3721 and ground GND. The conductance switching unit 3723 has four switches SW1 to SW4 connected on one side between the four resistors R1 to R4 and the resistor R4 and ground GND, and on the other side to the comparator 371. The constant current source 3722 is connected between the resistor R4 and ground GND.

The switches SW1 to SW4 of the conductance switching unit 3723 are analog switches. The switch SW1 is connected between the comparator 371 and a node between resistors R1 and R2. The switch SW2 is connected between the comparator 371 and a node between resistors R2 and R3. The switch SW3 is connected between the comparator 371 and a node between resistors R3 and R4. The switch SW4 is connected between the comparator 371 and a node between resistor R4 and ground GND. The conductance switching unit 3723 switches these switches SW1 to SW4 on and off based on signal input from the decoding circuit 38. When any one of the switches SW1 to SW4 is on (conductive) and the other switches are off (non-conductive), the supply voltage VDD output from the constant voltage supply 3721 is voltage converted according to the current IS output from the constant current source 3722 and the resistance R, and input to the comparator 371 as the prescribed reference voltage VREF.

When only switch SW1 is on the reference voltage switching unit 372 outputs the reference voltage VREF1 having the highest voltage to the comparator 371. When only switch SW2 is on the reference voltage switching unit 372 outputs the reference voltage VREF2 having the second highest voltage. When only switch SW3 is on the reference voltage switching unit 372 outputs the reference voltage VREF3 having the third highest voltage. When only switch SW4 is on the reference voltage switching unit 372 outputs the reference voltage VREF4 having the lowest voltage.

The decoding circuit 38 corresponds to the decoding unit of the accompanying claims, and is connected to the control means 4 described below by the intervening serial communication bus SL. The decoding circuit 38 decodes the control signal input from the control means 4 and based on the decoded control signal simultaneously outputs signals controlling the switching operations of the frequency switching unit 311 of the tuning circuit 31, the filter switching unit 331 and the parallel capacitance switching unit 332 of the bandpass filter 33, and the conductance switching unit 3723 of the demodulation circuit 37. This causes the frequency switching unit 311 to switch the capacitors C1 to C3, the filter switching unit 331 to switch the crystal filters XT1 to XT3, the parallel capacitance switching unit 332 to switch the parallel capacitances CC1 to CC4, and the conductance switching unit 3723 to switch the output reference voltage VREF1 to VREF4 simultaneously.

These switching operations are not necessarily simultaneous but must be executed in order for the reception means 3 to receive the desired standard time signal.

(3) Control Means

The control means 4 controls the reception means 3, corrects the internal time information based on the TCO signal output from the reception means 3, and causes the time display means 6 to display the corrected time. More specifically, the reception circuit of the invention includes the antenna 2, the reception means 3, and the control means 4.

As shown in FIG. 1 the control means 4 includes a oscillation unit 41, a frequency divider 42, a timecode decoding unit 43, a control unit 44, a time display drive unit 45, and a storage unit 46.

The oscillation unit 41 generates a signal of a prescribed frequency, and the frequency divider 42 generates the operating signals based on the signal from the oscillation unit 41. The oscillation unit 41 and the frequency divider 42 thus render an operating clock for generating and outputting signals of a specific frequency.

The timecode decoding unit 43 decodes the TCO signal, which is a digital signal input from the demodulation circuit 37 of the reception means 3, and gets date information and time information from the TCO signal. The timecode decoding unit 43 then outputs the decoded date and time information to the control unit 44.

An example of the timecode that is decoded by the timecode decoding unit 43 is described next.

Figure 4:
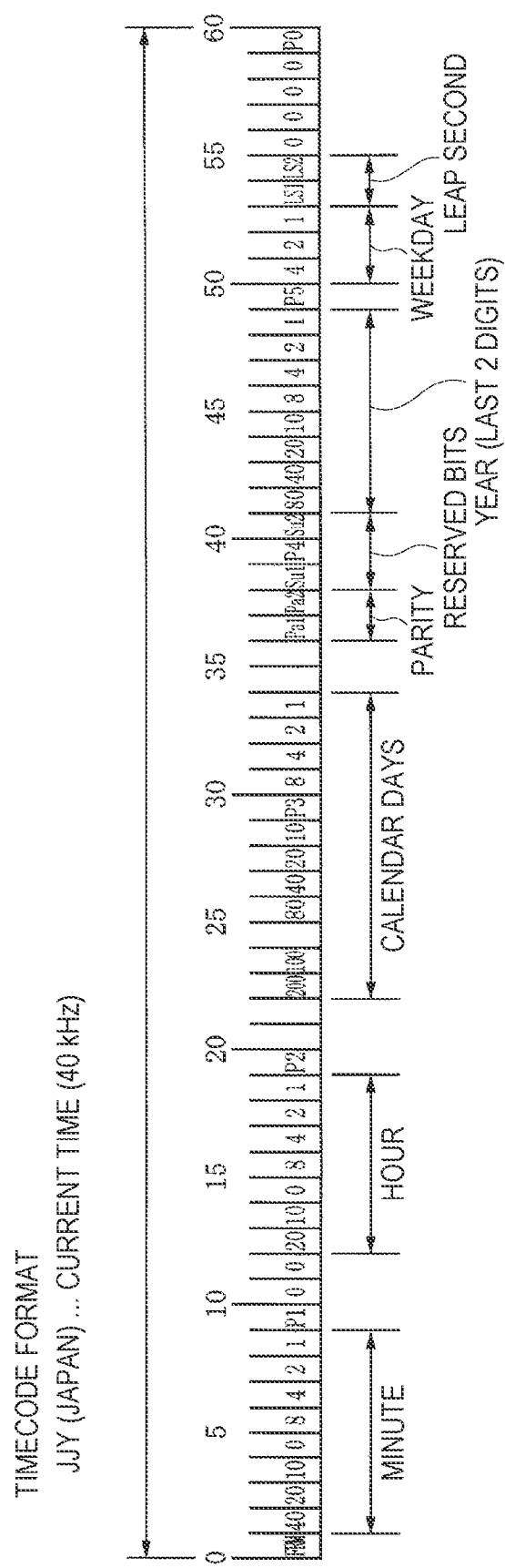
FIG. 4 shows the time code format of the 40-kHz JJY standard time signal that is broadcast in Japan.

FIG. 4 shows the timecode format of the 40-kHz JJY standard time signal that is broadcast in Japan.

As shown in FIG. 4, the JJY time signal transmits one signal per second and one record in 60 seconds. More specifically, one frame contains 60 data bits. The data fields include time information, including the hour and minute, and calendar information, including the number of calendar days since January 1 of the current year, the year (the lowest two digits of the Gregorian calendar year), and the day of the week. A known value is assigned to each second (bit), the value of each time or calendar information field is determined by the combination of values assigned to each second (bit) in the field, and whether a combination of values is on or off is determined from the types of signals.

Figure 5:
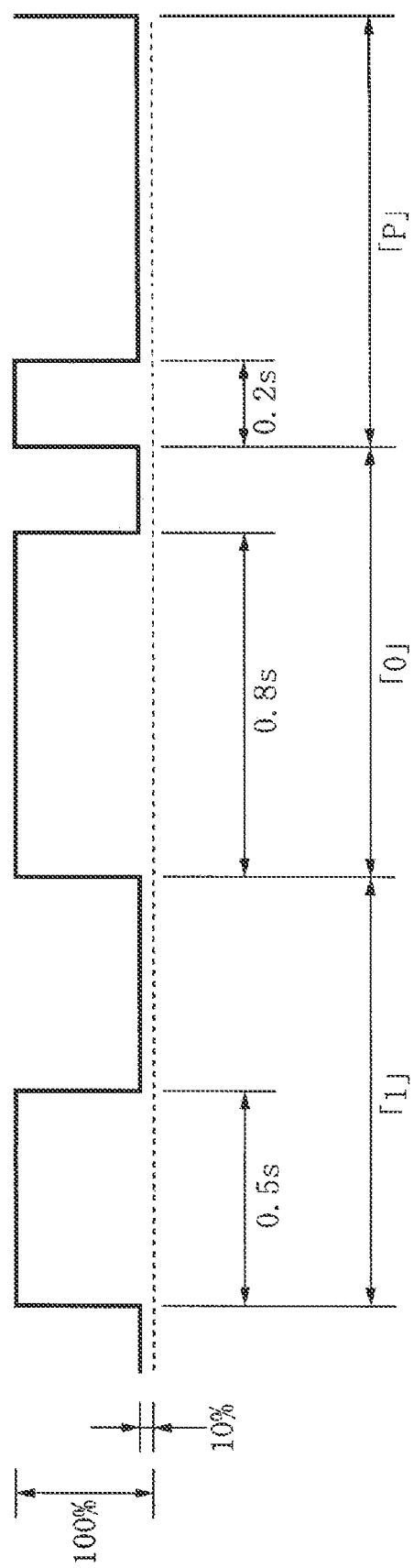
FIG. 5 shows the different signals contained in the JJY standard time signal.

FIG. 5 shows the types of signals contained in the JJY standard time signal.

As shown in FIG. 5 the JJY standard time signal in Japan contains three signals denoting 1, 0, and P. Each signal type is recognized from the length of the amplitude modulation time of the signal.

More specifically, a signal denoting a 1 maintains the HIGH voltage level for 0.5 second from the rising edge and is then held LOW for 0.5 second. The signal denoting a 0 is held HIGH for 0.8 second from the rising edge and then stays LOW (if the HIGH voltage level is 100%, the LOW voltage level is 10% of the HIGH voltage) for 0.2 second. The signal denoting a P stays HIGH for 0.2 second from the rising edge and then stays LOW for 0.8 second. Whether the input signal denotes a 1, 0, or P can thus be determined from the amplitude modulation time of the signal.

When a "1" signal is input, the timecode decoding unit accumulates the numeric value assigned to that signal (bit) for calculating the time or calendar information. If a signal denoting a 0 or P is input, the timecode decoding unit does not use the value assigned to the corresponding second (bit) to calculate the time or calendar information.

For example, if the standard time signal bits transmitted in the eight second period of the minute field are 1, 0, 1, 0, 0, 1, 1, 1, the minute of the current time is known to be 40+10+4+2+1=57.

A "P" bit in the timecode format of the standard time signal denotes a static value that is for synchronizing the timecode format with the standard time signal. Bits P0 and FRM in this timecode format are where two P bits occur consecutively, and the second P bit (FRM in FIG. 4) denotes the rising edge of the full minute (the 0 second of every minute). This P bit thus indicates that the second is 00, and indicates that the minute value has changed to the next minute.

It should be noted that because the longwave standard time signal is based on a cesium clock, a radio-controlled timepiece that adjusts the time based on the received longwave standard time signal is highly precise with an error of only one second in one-million years.

While the JJY time signal that is broadcast in Japan is described above, the timepiece 1 according to this aspect of the invention can also receive time signals transmitted in other countries, specifically the MSF, DCF77 and WWVB time signals that are transmitted in Britain, Germany, and the United States, respectively, and the timecode decoding unit 43 can decode the TCO signal of the received standard time signal to extract the calendar information and the time information. The timecode format and the amplitude modulation time of the signals carried in the standard time signal differ according to the country. The timecode decoding unit 43 therefore decodes the TCO signal input from the demodulation circuit 37 according to the standard time signal that is received and gets the date information and time information from the decoded TCO signal.

Referring again to FIG. 1, the control unit 44 controls the control means 4, and based on the date and time information input from the timecode decoding unit 43 corrects the internal calendar and time information stored in the storage unit 46. More specifically, the control unit 44 corresponds to the time adjustment circuit of the accompanying claims.

The control unit 44 is connected to the reception means 3 by a serial communication bus SL, and serially outputs control signals to the reception means 3. The control signal output by the control unit 44 to the decoding circuit 38 of the reception means 3 is a control signal for content based on the switching state information stored in the storage unit 46.

A two-channel synchronous interface enabling two-way communication between the control unit 44 and the reception means 3 could be used for serial communication between the control unit 44 and the reception means 3. This affords more reliable serial communication because the reception means 3 can return the received and recognized control signal to the control unit 44 after the control unit 44 outputs the control signal to the reception means 3, and the control unit 44 can detect any differences between the control signal output by the control unit 44 and the control signal input from the reception means 3.

The time display drive unit 45 is controlled by the control unit 44 to drive the time display means 6 and display the current time and current date, for example. If the time display means 6 is a liquid crystal display panel or an organic EL display panel, for example, the time display drive unit 45 could be the panel driver. If the time display means 6 uses analog hands, the time display drive unit 45 could be a motor driver for driving the motor that moves the hands.

FIG. 6 shows the content stored in the storage unit 46. More specifically, FIG. 6 is a table showing the content of the codes stored in the storage unit 46.

The storage unit 46 is equivalent to the storage means of the accompanying claims, and stores the data and programs used by the control means 4 to control the reception means 3. The storage unit 46 includes RAM (random access memory) and nonvolatile memory such as an EEPROM (electronically erasable and programmable read-only memory) device. The RAM stores the current time and current date information.

The switching information shown in FIG. 6 is stored to the EEPROM of the storage unit 46. This switching information defines which capacitor C1 to C3, crystal filter XT1 to XT3, parallel capacitance CC1 to CC4, and reference voltage VREF1 to VREF4 is to be used to receive the standard time signal based on the standard time signal that is to be received.

For example, the switching information labelled data_1 in FIG. 6 is used to receive the JJY40 Japanese time signal (that is, the time signal transmitted in Japan at 40 kHz). This data_1 record shows that capacitor C1, crystal filter XT1, parallel capacitance CC1, and reference voltage VREF2 are selected to receive the JJY40 signal. To receive the MSF time signal broadcast in Britain, the switching information defined in the data_3 record is used. This data_3 record shows that capacitor C2, crystal filter XT2, parallel capacitance CC2, and reference voltage VREF4 are selected to receive the MSF signal.

The parameters data_1 to data_5 are set according to the characteristics of the standard time signal to be received. For example, the data_1 parameters for the JJY40 Japanese time signal select the capacitor C1 used to receive a standard time signal transmitted at 40 kHz, select the crystal filter XT1 with an oscillation frequency of 40 kHz, select the parallel capacitance CC1 corresponding to the selected crystal filter XT1, and select the reference voltage VREF2 based on the amplitude characteristics (described below) of the JJY40 time signal.

These data_1 to data_5 parameters defined for each standard time signal that can be received thus set the capacitor C (C1 to C3) of the tuning circuit 31, the crystal filter XT (XT1 to XT3) and parallel capacitance CC (CC1 to CC4) of the bandpass filter 33 and the reference voltage VREF (VREF1 to VREF4) that are required to set the optimal reception conditions for receiving the desired standard time signal.

Note that the specific part names and indices are shown in FIG. 6 to simplify describing the settings of each data record, but the actual data is encoded for storage and is decoded by the decoding circuit 38 to which the data is input.

The reference voltage VREF set in data_1 to data_5 is described next.

FIG. 7 shows binary signals that are digitized based on the reference voltage from the original waveform of a standard time signal. More specifically, FIG. 7A shows the original waveform of the binary signal, FIG. 7B shows the waveform after detecting the envelope of the signal shown in FIG. 7A, and FIG. 7C to FIG. 7E show the waveforms of the binary signals that are digitized based on the signal shown in FIG. 7B and reference voltages VREF-A, VREF-B, and VREF-C, respectively.

When a standard time signal containing the TCO signal shown in FIG. 7A is received and the envelope is detected by the reception means 3, the TCO signal cannot be accurately demodulated because of the effects of high frequency noise such as the carrier wave component of the standard time signal as shown by the waveform in FIG. 7B. The demodulation circuit 37 therefore compares the signal after envelope detection with a reference voltage to output a binary signal.

As indicated by the arrows in FIG. 7C, however, the binary signal resulting from comparing the signal after envelope detection with the reference voltage VREF-A denoted by the dotted line in FIG. 7B, that is, a reference voltage VREF-A that is higher than the median voltage between the peak and the bottom of the signal after envelope detection, differs in places from the original waveform shown in FIG. 7A.

As indicated by the arrows in FIG. 7D, the binary signal resulting from comparing the signal after envelope detection with the reference voltage VREF-B denoted by the dotted line in FIG. 7B, that is, a reference voltage VREF-B that is lower than the median voltage between the peak and the bottom of the signal after envelope detection, also differs in places from the original waveform shown in FIG. 7A.

However, as shown in FIG. 7E, the binary signal resulting from comparing the signal after envelope detection with the reference voltage VREF-C denoted by the dot-dash line in FIG. 7B, that is, a reference voltage VREF-C that is equal to the median voltage between the peak and the bottom of the signal after envelope detection, matches the original waveform shown in FIG. 7A or at least has a lower error rate than the signals obtained using reference voltages VREF-A and VREF-B.

Figure 8:
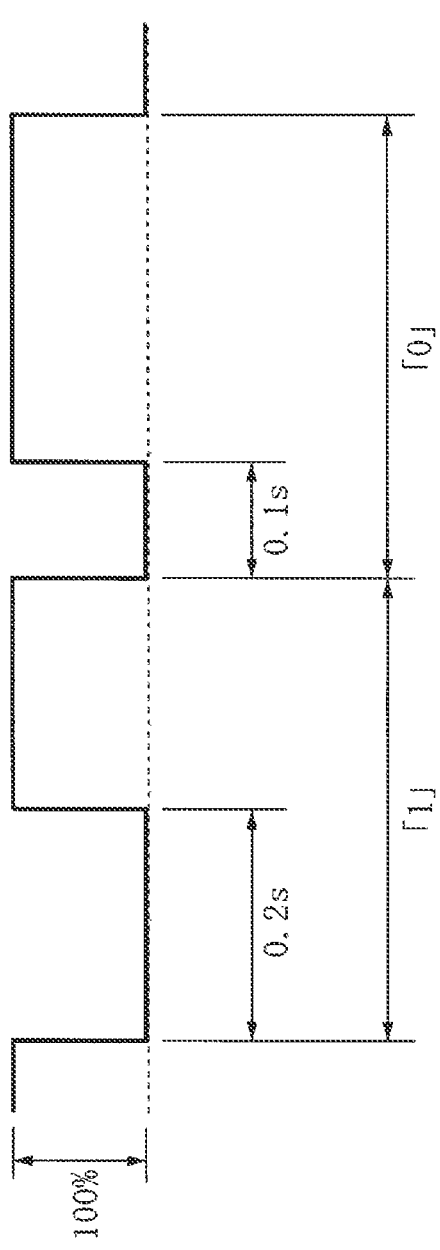
FIG. 8 shows the amplitude of the TCO signal in the British standard time signal (MSF).
Figure 9:
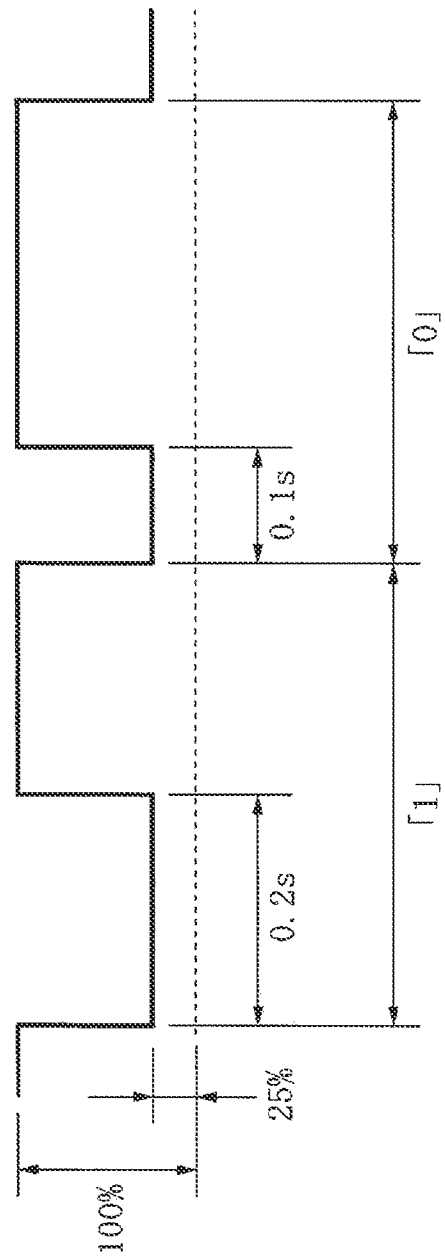
FIG. 9 shows the amplitude of the TCO signal in the German standard time signal (DCF).

FIG. 8 and FIG. 9 show the amplitude of the TCO signals of the MSF time signal broadcast in Britain and the DCF time signal broadcast in Germany.

If the reference voltage is set to decode one standard time signal, however, the reference voltage is not suitable for decoding the other time signal.

This is because the difference between the peak voltage and the bottom voltage of the TCO signal is not the same in both standard time signals.

More specifically, if the peak voltage is 100%, the bottom voltage is 10% (see FIG. 5) in the JJY time signal transmitted in Japan, 0% in the MSF time signal used in Britain (FIG. 8), and 25% in the DCF time signal transmitted in Germany (FIG. 9).

As a result, if the reference voltage switching unit 372 of the demodulation circuit 37 outputs the same reference voltage to the comparator 371 in order to receive and demodulate each of these time signals, noise from the carrier wave component, for example, may prevent correctly extracting the TCO signal.

Figure 10:
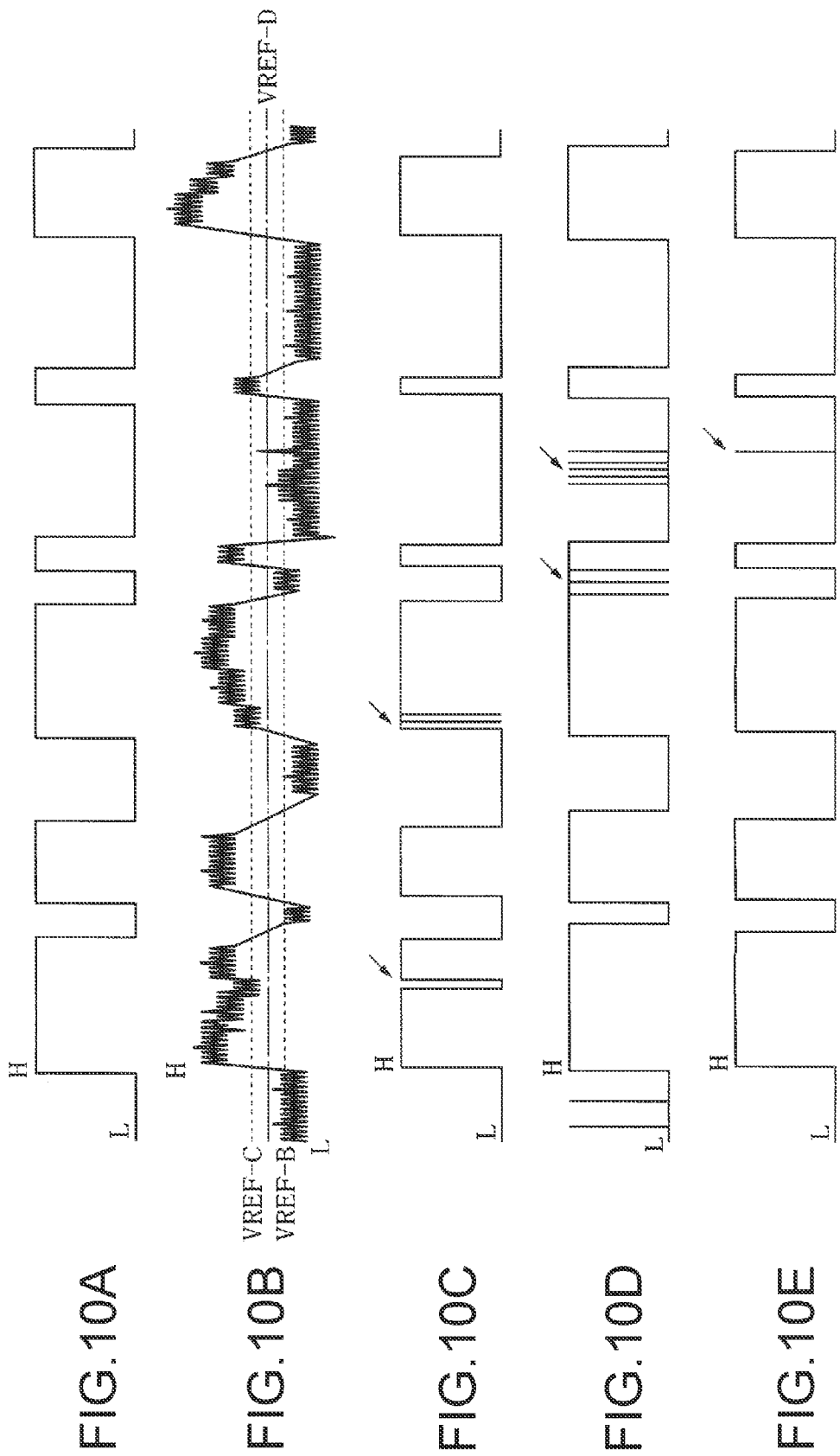
FIG. 10A shows the original waveform of the binary signal.
FIG. 10B shows the waveform after detecting the envelope of the binary signal.
FIG. 10C shows the waveform of the binary signal based on the reference voltage and the signal of the waveform after envelope detection.
FIG. 10D shows the waveform of the binary signal based on the reference voltage and the signal of the waveform after envelope detection.
FIG. 10E shows the waveform of the binary signal based on the reference voltage and the signal of the waveform after envelope detection.

FIG. 10 shows a binary signal that is digitized using the reference voltage from a standard time signal with an original waveform that is different from the waveform of the standard time signal shown in FIG. 7. More specifically, FIG. 10A shows the original waveform of the binary signal, FIG. 10B shows the waveform after detecting the envelope of the signal shown in FIG. 10A, and FIG. 10C to FIG. 10E show the waveforms of the binary signals that are digitized based on the signal shown in FIG. 10B and reference voltages VREF-C, VREF-D, and VREF-B, respectively.

More specifically, when the signal is digitized by comparing the envelope signal of the standard time signal shown in FIG. 10, which has a smaller difference between the peak voltage and the bottom voltage than the standard time signal shown in FIG. 7, with the reference voltage VREF-C that is set for the standard time signal shown in FIG. 7, the resulting binary signal differs in places from the original waveform shown in FIG. 10A as indicated by the arrows in FIG. 10C.

If a reference voltage VREF-B that is lower than the reference voltage VREF-C is used to digitize the envelope signal, the resulting binary signal will again differ from the original waveform as indicated by the arrows in FIG. 10D.

However, if the signal is digitized by comparing the envelope signal with a reference voltage VREF-D that is set to the median between the peak and bottom voltages of the standard time signal, there are fewer errors in the resulting binary signal than when reference voltage VREF-B or VREF-C is used as shown in FIG. 10E.

It will thus be apparent that the reference voltage must be set according to the standard time signal being received in order to correctly demodulate the standard time signal.

The voltage of the reference voltage VREF1 that is output by the reference voltage switching unit 372 of the demodulation circuit 37 shown in FIG. 2 when only the switch SW1 is on, the voltage of the reference voltage VREF2 that is output when only the switch SW2 is on, the voltage of the reference voltage VREF3 that is output when only the switch SW3 is on, and the voltage of the reference voltage VREF4 that is output when only the switch SW4 is on are measured in order to appropriately set each reference voltage VREF. The reference voltage VREF1 to VREF4 that is substantially equal to the median voltage between the peak voltage and the bottom voltage of the envelope signal input to the comparator 371 of the demodulation circuit 37 is then selected when a standard time signal is received.

The on/off state of each switch SW1 to SW4 that is needed to output the selected reference voltage, or more specifically information indicating which switch is on, is then stored as the switching state information for each data record in the EEPROM.

The control unit 44 then reads the configuration parameters data_1 to data_5 to output a control signal to the decoding circuit 38 of the reception means 3 over the serial communication bus SL, and the reference voltage switching unit 372 outputs the reference voltage for the standard time signal to be received so that the received signal can be correctly demodulated.

(4) Standard Time Signal Reception Process

The standard time signal reception process executed by the timepiece 1 to receive a standard time signal is described next.

Figure 11:
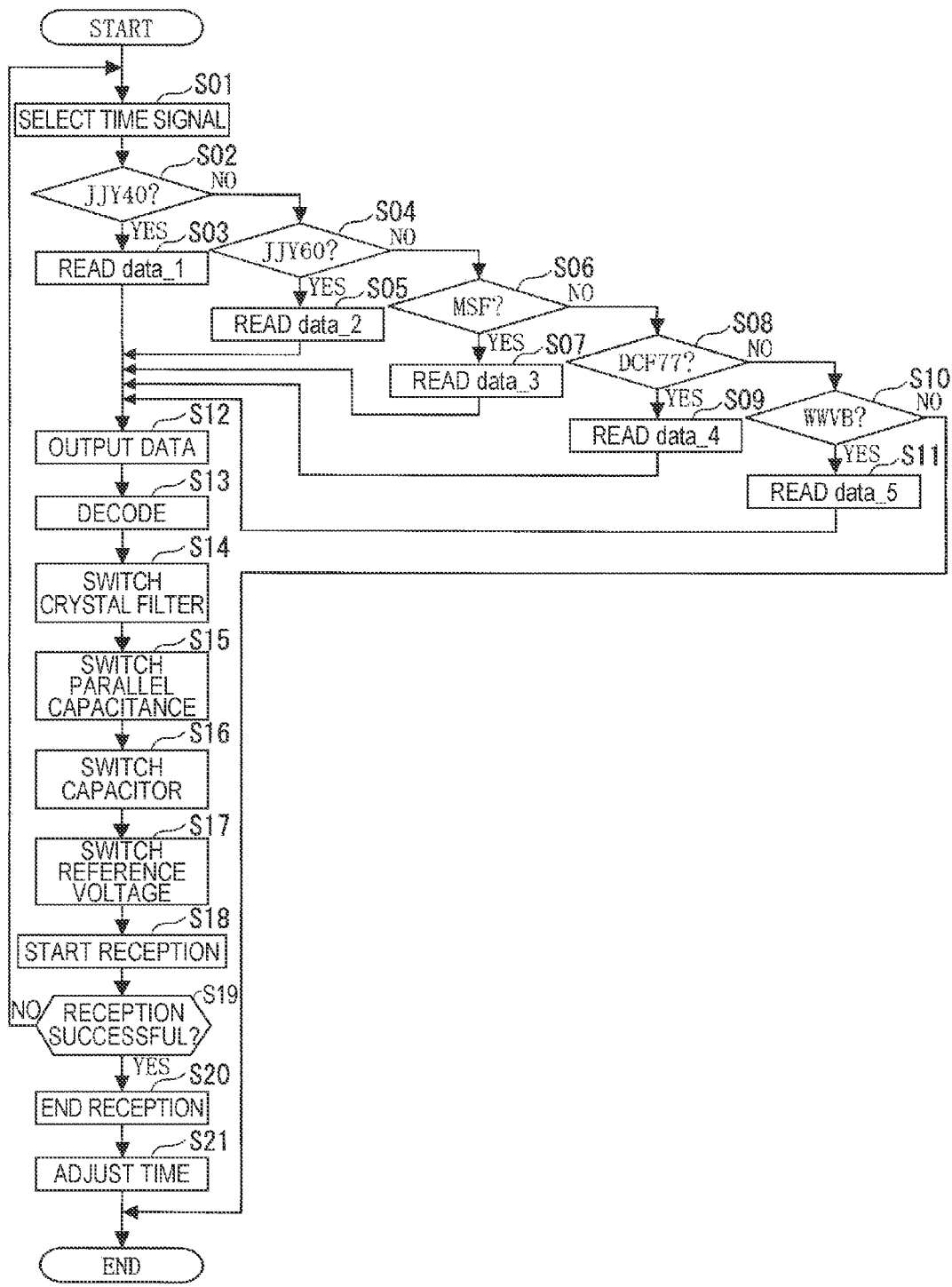
FIG. 11 is a flow chart of the reception process for receiving a standard time signal in this preferred embodiment of the invention.

FIG. 11 is a flow chart of the standard time signal reception process.

To receive a standard time signal the control unit 44 of the control means 4 reads the configuration data for the standard time signal to be received from the storage unit 46 and outputs the data as a control signal to the reception means 3. This causes the tuning circuit 31, first amplifier circuit 32, and the demodulation circuit 37 of the reception means 3 to switch so that the desired standard time signal can be received.

More specifically, when the standard time signal reception process starts the control unit 44 of the control means 4 first selects the standard time signal to be received (reception signal selection step, S01) as shown in FIG. 11. In step S01 the control unit 44 selects the standard time signal to be received in the order of the switching information stored in the EEPROM of the storage unit 46. In this example the control unit 44 therefore first selects the JJY40 time signal transmitted at 40 kHz in Japan.

The control unit 44 then determines if the standard time signal set to be received is JJY40 (reception signal evaluation step S02). If the standard time signal to be received is determined to be JJY40, the control unit 44 reads the parameters in data_1 from the EEPROM of the storage unit 46 (switching information configuration step S03). The control unit 44 then skips to step S12.

If the standard time signal to be received is not JJY40, the control unit 44 determines if the standard time signal to be received is JJY60 (reception signal evaluation step S04). If the standard time signal to be received is determined to be JJY60, the control unit 44 reads the parameters in data_2 (switching information configuration step S05). The control unit 44 then skips to step S12.

If the standard time signal to be received is not JJY60, the control unit 44 determines if the standard time signal to be received is the British time signal MSF (reception signal evaluation step S06). If the standard time signal to be received is determined to be MSF, the control unit 44 reads the parameters in data_3 (switching information configuration step S07) and then skips to step S12.

If the standard time signal to be received is not MSF, the control unit 44 determines if the standard time signal to be received is the German time signal DCF77 (reception signal evaluation step S08). If the standard time signal to be received is determined to be DCF77, the control unit 44 reads the parameters in data_4 (switching information configuration step S09) and then skips to step S12.

If the standard time signal to be received is not DCF77, the control unit 44 determines if the standard time signal to be received is the U.S. time signal WWVB (reception signal evaluation step S10). If the standard time signal to be received is determined to be WWVB, the control unit 44 reads the parameters in data_5 (switching information configuration step S11) and then skips to step S12.

If the control unit 44 determines that the standard time signal to be received is not WWVB, the control unit 44 decides that a standard time signal that cannot be received has been set for reception and the process ends.

In step S12 the control unit 44 outputs the data read from memory over the serial communication bus SL to the decoding circuit 38 of the reception means 3 (switching information output step, S12).

The decoding circuit 38 then decodes the data input as the switching information, and based on the decoded switching information outputs switching signals to the filter switching unit 331, the parallel capacitance switching unit 332, and the frequency switching unit 311 of the bandpass filter 33, and to the reference voltage switching unit of the demodulation circuit 37 (switching information decoding step S13).

The filter switching unit 331 of the bandpass filter 33 to which signals from the decoding circuit 38 are input then sets the on/off states of the switches connected to the crystal filters XT1 to XT3 so that the reception signal of the standard time signal to be received is passed to the crystal filter XT denoted by the signal input from the decoding circuit 38 (filter switching step, S14).

The parallel capacitance switching unit 332 of the bandpass filter 33 likewise sets the on/off states of the switches connected to the parallel capacitances CC1 to CC4 so that the reception signal is passed to the parallel capacitance CC denoted by the signal from the decoding circuit 38.

In addition to thus switching the crystal filter XT and the parallel capacitance CC, the frequency switching unit 311 of the tuning circuit 31 to which a control signal is input from the decoding circuit 38 sets the on/off states of the switches based on the input signal to select the capacitor C denoted by the data (frequency selection step, S16). This tunes the antenna 2 to the frequency of the standard time signal to be received.

While steps S14 to S16 execute, the reference voltage switching unit 372 of the demodulation circuit 37 sets the on/off states of the switches SW1 to SW4 according to the signal input from the decoding circuit 38 to set the reference voltage VREF output to the comparator 371 (reference voltage selection step, S17). This causes the reference voltage VREF that is stored in the storage unit 46 for the standard time signal to be output to one input node of the comparator 371.

This sequence of steps thus sets the crystal filter XT and the parallel capacitance CC of the bandpass filter 33, the tuning frequency, and the reference voltage VREF according to the type of standard time signal to be received.

The reception means 3 then starts to receive the desired standard time signal (standard time signal reception step, S18), and the received standard time signal is amplified, rectified, filtered, and digitized, and the resulting binary signal is output from the demodulation circuit 37 to the timecode decoding unit 43 of the control means 4. The timecode decoding unit 43 then inputs the time information, for example, to the control unit 44.

The control unit 44 then determines if the standard time signal was successfully received (reception validation step, S19). More specifically, the control unit 44 determines from the input time information, for example, whether the received time signal is the time signal that was set in step S01. If the control unit 44 determines that the time signal could not be received, or more specifically determines that the TCO signal of the standard time signal selected in step S01 could not be corrected decoded, control goes back to step S01 and a different standard time signal is selected for reception. Because the standard time signal to be received is selected in the order in which the switching information is stored to the storage unit 46 as noted above, JJY60 (the time signal transmitted at 60 kHz in Japan) is selected if the JJY40 signal could not be received, the MSF signal is selected if JJY60 could not be received, and so forth until the WWVB signal is selected.

If the control unit 44 determines that the standard time signal was successfully received, time signal reception ends (step S20) and the control unit 44 then corrects the internal time and date information stored in the storage unit 46 as necessary based on the input time information and calendar information (data correction step, S21).

This completes the standard time signal reception process.

(5) Effects of the Invention

The timepiece 1 according to this embodiment of the invention affords the following benefits.

Based on a control signal input from the control unit 44 of the control means 4, the filter switching unit 331 and the parallel capacitance switching unit 332 of the bandpass filter 33 switch the crystal filter XT and the parallel capacitance CC. More specifically, the control unit 44 outputs control signals for setting the crystal filter XT and the parallel capacitance CC based on the characteristics of the standard time signal to be received, and the filter switching unit 331 and the parallel capacitance switching unit 332 select the crystal filter XT and the parallel capacitance CC denoted by the control signal. The crystal filter XT appropriate to the standard time signal to be received and the parallel capacitance CC parallel connected to the crystal filter XT are thus selected to more effectively remove high frequency noise from the reception signal passing the crystal filter XT and the parallel capacitance CC. High frequency noise can thus be effectively removed from the reception signal, and the received standard time signal can be correctly demodulated.

Furthermore, in conjunction with the filter switching unit 331 and the parallel capacitance switching unit 332 selecting the crystal filter XT and the parallel capacitance CC, the frequency switching unit 311 of the tuning circuit 31 sets the switch connected to the capacitor C according to the control signal input from the control unit 44 and decoded by the decoding circuit 38 to change the tuning frequency of the antenna 2. The crystal filter XT and the parallel capacitance CC can therefore be reliably switched to receive the desired standard time signal. High frequency noise can thus be reliably removed from the reception signal and standard time signal reception characteristics can be improved.

When the crystal filter XT, the parallel capacitance CC, and the capacitor C are selected, the reference voltage switching unit 372 also sets the reference voltage VREF to be input to the comparator 371 of the demodulation circuit 37. The reference voltage switching unit 372 operates according to a signal that is input from the control unit 44 and decoded by the decoding circuit 38, and this decoded signal denotes the reference voltage VREF that is appropriate to the characteristics of the time signal to be received.

By thus inputting a reference voltage VREF that is appropriate to the characteristics of the time signal to be received to the comparator 371, errors introduced by the comparator 371 to the binary timecode signal decoded from the received standard time signal can be suppressed. The received time signal can therefore be correctly demodulated and the time signal reception characteristics can be improved.

Furthermore, because the reference voltage VREF that is set for each standard time signal to be received is set based on the measured voltage of the reference voltage VREF output from the reference voltage switching unit 372, variations in the reception circuit for demodulating the received standard time signal (the reception circuit including the reception means 3 and the control means 4) that are introduced in the manufacturing process can be corrected. A reference voltage VREF appropriate to the standard time signal can therefore be input to the comparator 371. The received time signal can therefore be correctly demodulated and the time signal reception characteristics can be improved.

The control unit 44 of the control means 4 and the decoding circuit 38 of the reception means 3 are connected by a serial communication bus SL, and the control unit 44 serially outputs data stored as the switching information in the storage unit 46. The number of data lines in the communication bus connecting the control unit 44 and the decoding circuit 38 can therefore be reduced. The arrangement of the timepiece 1 can therefore be simplified.

In addition, because the control unit 44 serially outputs the control signal, the data transmission rate can be improved and signal errors can be reduced.

Switching parameters data_1 to data_5 including the crystal filter XT, the parallel capacitance CC, the capacitor C, and the reference voltage VREF to be selected to receive a particular standard time signal are stored as switching information in the storage unit 46, and the control unit 44 outputs the control signals based on this data. The control unit 44 can therefore optimally configure the reception means 3, that is, set the crystal filter XT, the parallel capacitance CC, the capacitor C, and the reference voltage VREF, according to the type of standard time signal to be received by the reception means 3.

Furthermore, by providing data for a plurality of standard time signals, the invention affords a reception circuit (a reception circuit including the reception means 3 and the control means 4) and a timepiece 1 having this reception circuit that can correctly demodulate the standard time signals transmitted in different formats in different countries.

The control unit 44 can also reliably and appropriately reset the reception circuit because it is not necessary to calculate or determine the crystal filter XT, the parallel capacitance CC, the capacitor, and the reference voltage VREF for the standard time signal to be received. The reliability of the switching operations can therefore be improved, and the demodulation reliability and reception characteristics of the standard time signal can be further improved.

(6) Other Aspects of the Invention

A preferred embodiment of the invention is described above by way of example, but the invention is not limited to the foregoing description. More specifically, the invention is described and shown in the figures using a specific embodiment of the invention by way of example, but the shape, materials, quantities, and other details of the arrangement and operation of the invention can be modified in many ways by one with ordinary skill in the related art without departing from the technical concept of the invention or the scope of the accompanying claims, and all such variations and modifications are included in the scope of the present invention.

For example, control signals from the control unit 44 of the control means 4 are serially output over the serial communication bus SL to the decoding circuit 38 of the reception means 3 in the embodiment described above, but the invention is not so limited. More particularly, the control signal can be output using a parallel communication bus.

The control signal input to the reception means 3 is decoded by the decoding circuit 38 above, but the control unit 44 of the control means 4 could directly output control signals to the filter switching unit 331, the parallel capacitance switching unit 332, the frequency switching unit 311, and the reference voltage switching unit 372.

The frequency switching unit 311, the filter switching unit 331, the parallel capacitance switching unit 332, and the reference voltage switching unit 372 each have a plurality of switches and the reception circuit is configured by switching the on/off states of these switches, but the invention is not so limited. More specifically, switching elements that are digitally switched on and off can be used instead of analog switches.

The actual voltage of the reference voltages VREF1 to VREF4 is measured and the reference voltage VREF is set according to the standard time signal based on the measured voltages in the foregoing embodiment of the invention, but the invention is not so limited. For example, the capacitor C of the tuning circuit 31 and the parallel capacitance CC of the bandpass filter 33 could be inspected, the capacitance of capacitor C and the parallel capacitance CC can be set according to the standard time signal to be received based on the inspection results, and these settings can be written to EEPROM. Manufacturing deviations in the reception means 3 can therefore be corrected, and the standard time signal reception characteristics of the reception means 3 can be further improved.

The switching information is stored in an EEPROM device as the nonvolatile memory part of the storage unit 46 in the foregoing embodiment of the invention, but the invention is not so limited and flash memory or fuses could be used instead. More specifically, the switching information can be stored in any suitable manner.

If the switching information is stored in volatile memory, the decoding circuit 38 can output data-based signals based on the switching information stored in volatile memory.

The data read from the EEPROM (that is, the data parameters read from data_1 to data_5 in FIG. 6) can alternatively be stored in the reception means 3 using a latch or other volatile memory device after reception ends. In this case serial communication between the control unit 44 and reception means 3 is not necessary each time the standard time signal reception process starts, and the reception process can be simplified when the reception circuit continually receives the same type of standard time signal in the same place. More specifically, by storing the previous reception settings, operation can start from step S18 described above when receiving the same type of standard time signal that was last received, and the standard time signal reception process can be simplified. If the amount of data that is exchanged between the control means 4 and the reception means 3 is small such as in this case, parallel communication can be used instead of serial communication.

The timepiece 1 in the foregoing embodiment of the invention can receive the JJY40 and JJY60 standard time signals transmitted in Japan, the MSF time signal transmitted in Britain, the DCF time signal transmitted in Germany, and the WWVB time signal transmitted in the United States, but the invention is not so limited. More specifically, if the reception circuit of the invention can receive at least two standard time signals, the invention can be arranged to receive other standard time signals.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A reception circuit that can receive a plurality of standard time signals, comprising:
   a reception means for selectively receiving and demodulating any one of the plural standard time signals; and
   a control means for outputting a control signal that controls the reception means;

wherein the reception means includes:
   a signal amplifier unit for amplifying a reception signal representing the received standard time signal;
   a signal extraction unit for extracting a signal of a specific frequency from the amplified reception signal;
   a rectifier unit for rectifying the extracted signal of the specific frequency; and
   a demodulation unit for demodulating the rectified signal of the specific frequency;
the signal extraction unit includes:
   a plurality of crystal filters corresponding to the frequencies of the plural standard time signals;
   a plurality of parallel capacitances corresponding to the plural crystal filters and parallel connected to the plural crystal filters;
   a filter switching unit for switching the plural crystal filters based on the control signal; and
   a parallel capacitance switching unit for switching the plural parallel capacitances based on the control signal; and
   the control means outputs to the filter switching unit and the parallel capacitance switching unit a control signal denoting the switch states enabling the reception means to receive the standard time signal.

2. The reception circuit described in claim 1, further comprising:
   an antenna for receiving the plurality of standard time signals;
   wherein the reception means includes a tuning unit for switching the tuning frequency of the antenna based on the control signal to receive any one of the plural standard time signals; and
   the control means outputs to the tuning unit a control signal denoting the switch state enabling the reception means to receive the standard time signal.

3. The reception circuit described in claim 1, wherein:
   the demodulation unit includes a comparison unit for outputting a binary signal that is digitized based on a reference voltage and the signal of the specific frequency rectified by the rectifier unit;
   the reception means includes a reference voltage switching unit that can output a plurality of reference voltages to the comparison unit and selects the output reference voltage according to the standard time signal to be received by the reception circuit; and
   the control means outputs to the reference voltage switching unit a control signal denoting the switch states enabling the reception means to receive the standard time signal to be received.

4. A reception circuit that can receive a plurality of standard time signals, comprising:
   a reception means for selectively receiving and demodulating any one of the plural standard time signals; and
   a control means for outputting a control signal that controls the reception means;
   wherein the reception means includes:
      a signal amplifier unit for amplifying a reception signal representing the received standard time signal;
      a rectifier unit for rectifying the amplified reception signal;
      a filter unit for filtering the rectified reception signal;
      a comparison unit for outputting a binary signal that is digitized based on a reference voltage and the filtered reception signal; and
   a reference voltage switching unit that can output different reference voltages to the comparison unit and selects the output reference voltage according to the control signal;
   wherein the control means outputs to the reference voltage switching unit a control signal denoting the switch states enabling the reception means to receive the standard time signal to be received.

5. The reception circuit described in claim 4, further comprising:
   a serial communication bus connecting the control means and the reception means;
   wherein the control means serially outputs the control signal; and
   the reception means includes a decoding unit that decodes the control signal input by serial communication over the serial communication bus and controls switch operation based on the decoded control signal.

6. The reception circuit described in claim 4, further comprising:
   a storage means for storing switching information denoting the switch states for each of the plural standard time signals;
   wherein the control means outputs the control signal based on the switching information.

7. A radio-controlled timepiece comprising:
   the reception circuit described in claim 4; and
   a time adjustment circuit for correcting internal time information based on a signal demodulated by the reception circuit.

8. A control method for a reception circuit that can receive a plurality of standard time signals and has a reception means for selectively receiving and demodulating any one of the plural standard time signals,
   the reception means including:
      a plurality of crystal filters each of which extracts a signal of a different specific frequency from a reception signal representing the received standard time signal,
      a plurality of parallel capacitances provided according to the plural standard time signals and parallel connected to the plural crystal filters,
      a filter switching unit for switching the plural crystal filters based on the control signal, and
      a parallel capacitance switching unit for switching the plural parallel capacitances based on the control signal,
   wherein the control method comprises:
      a filter switching step for switching the filter switching unit to select the crystal filter appropriate to the standard time signal to be received by the reception means from among the plural crystal filters; and
      a parallel capacitance switching step for switching the parallel capacitance switching unit to select the parallel capacitance appropriate to the standard time signal to be received by the reception means from among the plural parallel capacitances.

* * * * *